United States Patent Office 3,594,217
Patented July 20, 1971

3,594,217
BINDER FOR THIN LAYER CHROMATOGRAPHIC ADSORBENTS
Earl K. Seybert, Towson, and Philip W. Link, Baltimore, Md., assignors to W. R. Grace & Co., New York, N.Y.
No Drawing. Filed May 21, 1968, Ser. No. 730,934
Int. Cl. C03c 17/22, 17/00
U.S. Cl. 117—119.6     9 Claims

ABSTRACT OF THE DISCLOSURE

Improved plates for thin layer chromatography are prepared by incorporating alkali metal silicates into the adsorbent layer. The presence of the silicate binder serves to prevent cracking, crazing, or separation of the adsorbent from the substrate.

---

The present invention relates to thin layer chromatographic plates. More specifically the invention relates to binders for securing thin layer chromatographic adsorbent layers to their substrates.

Thin layer chromatography (hereinafter referred to as TLC) is a relatively recent advance in the art of separating mixtures containing relatively small amounts of compounds. Its use has become widespread, however, because of its utility in separating organic compounds common to the life sciences, particularly to biochemistry and medicine. Many uses outside these areas have also been found such as the separation of certain inorganic ions.

The chromatographic plate used in TLC is usually a rectangular glass plate which has been coated with a thin layer (about 0.2–3 mm.) of adsorbent such as silica gel or aluminum oxide. In preparing such plates, however, it has become apparent that layers of the pure adsorbents which have to be used in fine particle size do not sufficiently adhere to the glass plates on which they are spread. Such layers are susceptible to mechanical influences and easily experience cracking, crazing, and separation from the glass substrate.

Several prior art methods have been proposed to more firmly attach the adsorbent layer to the substrate and thus eliminate the previous mechanical disadvantages. For example, Meinhard and Hall (Analytical Chemistry, vol. 21, 1949, page 185) added starch to increase the adherence of the adsorbent. By another technique, gypsum has been applied to mechanically stabilize the layer (Kirchner et al., Analytical Chemistry, vol. 23, 1951, page 420; and Stahl, Chemiker-Zeitung, vol. 82, 1958, page 323). Still another technique is the addition of finely divided silicon dioxide as disclosed by Halpaap et al. in U.S. Pat. No. 3,303,043. However, these and other prior art methods have resulted in shortcomings such as charring when exposed to corrosive agents such as sulfuric acid, or when subjected to high temperatures. Other undesirable characteristics of prior art plates are poor adhesion, adverse effects on dye or solvent actions, and reduction in separation efficiency.

It is therefore an object of this invention to provide a new adsorbent for use in thin layer chromatography.

It is a further object of this invention to provide a new adsorbent for use in thin layer chromatography which substantially eliminates the hereinbefore described disadvantages.

It is still another object of this invention to provide a binder for thin layer chromatographic adsorbents.

Yet another object of this invention is to provide a binder for thin layer chromatographic adsorbents wherein said binder does not impair the utility of the adsorbent.

Still other objects and advantages of this invention will become apparent upon study of the specification and the appended claims.

In summary, this invention is a process for preparing thin layer chromatographic plates which comprises preparing a slurry of chromatographic adsorbent in an aqueous solution of alkali metal silicate, applying a thin layer of said slurry to a suitable substrate, and initially drying the thus coated substrate in an atmosphere of high relative humidity.

As used herein, the term "chromatographic adsorbent" means silica gel, aluminum oxide, diatomaceous earth, silica and any other substance suitable for use as a separatory phase or layer in TLC. Preferably, the adsorbent is finely ground, having a particle size of 100 to 200 mesh, but if desired, larger or smaller particle sizes can be employed.

The slurries of chromatographic adsorbent which are useful in this invention comprise as a solid phase, the above described chromatographic adsorbents, and as a liquid phase, aqueous alkali metal silicate solutions of 4–40° Bé. The weight ratio of solid phase to liquid phase which is adaptable to this invention is about 1–3 solids to 6 liquid. Optimum results are obtained from a slurry comprising a 2–6 weight ratio of solid to liquid, said liquid being a 4 to 10° Bé. aqueous alkali metal silicate solution.

The alkali metal silicates most advantageously used in this invention are sodium silicate and potassium silicate, but silicates of other alkali metals may be substituted.

In preparing the slurry of chromatographic adsorbent in aqueous alkali metal silicates solution, usual mixing devices such as Waring or Oster blenders may be employed. Typically, both the finely divided adsorbent and the silicate solution are placed into a Waring Blendor and the cover affixed before blending. However, other suitable methods as are known to those skilled in the art may be used, as long as said method produces a smooth, evenly flowing, easily applicable mixture of a paste-like consistency.

Substrates used in this invention may be fabricated from any material which is compatible with the intended use of the TLC plate. Generally the substrate should be rigid or essentially rigid and may be a metal such as steel or platinum, porcelainized metal, glass, rigid plastics such as Bakelite, or other like material.

The preferred substrates for use in this invention are glass plates, and these are prepared by scrupulous cleaning. A preferred cleansing procedure comprises washing the plates in aqueous detergent, rinsing in distilled water, drying, washing with an organic solvent such as pentane, and again drying the plates thoroughly.

To prepare the TLC plates used in this invention, the slurry of chromatographic adsorbent in aqueous akali metal silicate solution, having been adjusted to a consistency suitable for application, is applied to glass plates. Preferably, thickness of said adsorbent films are limited to the range of about 0.2–3 mm., but thinner or thicker films may be used if desired. Film thicknesses are measured as the adsorbent slurry is laid on the substrate and hence thickness measurements correspond to wet films. The thickness of the dried films are not measured but can be calculated as a function of wet film thickness and weight percent of solids in the adsorbent slurry. Any application device which produces a homogeneous, continuous film of the desired thickness may be used.

The thus coated glass plates are then placed in a drying chamber at room temperature, said chamber having a relative humidity of about 80%. When the plates are sufficiently dry (usually 1–4 hrs.) they are removed from the drying chamber and drying is completed by exposing the plates to atmospheric conditions.

Without further elaboration, it is believed that one skilled in the art of TLC can, by following the preceding description, utilize the present invention to its fullest extent.

The following examples are provided to further point out the various aspects of the invention, but are in no way intended to limit said invention.

EXAMPLE 1

A slurry of 40 grams silica (Davison Chemical Company TLC grade, particle size 100–200 mesh) and 115 grams of 6° Bé. sodium silicate solution was prepared in a Waring Blendor, thus obtaining a thin paste suitable for casting in a thin film. A square glass plate measuring 8 x 8 inches was thoroughly cleaned by washing with aqueous detergent solution, drying, washing with pentane, and again drying. To the thus prepared plate was applied a 1 mm. film of the aforementioned thin paste. This was accomplished using a Desaga type applicator, a device which can be adjusted to lay films of various thicknesses. Initial drying was achieved by placing the plate in a closed chamber at room temperature, having an atmosphere of 80% relative humidity for 2 hours, whereupon the plate was removed and permitted to complete its drying process at room temperature and humidity. The thus prepared TLC plate was found to have a firmly attached, uniform, non-charring adsorbent layer.

EXAMPLE 2

A slurry of 40 grams of aluminum oxide (particle size 100–200 mesh) and 115 grams of 6° Bé. sodium silicate solution was prepared, applied to a glass plate, and dried in the same manner as in Example 1 and similar results were obtained.

EXAMPLE 3

A TLC plate was prepared as in Example 1 except that a potassium silicate solution of 6° Bé. was used instead of the sodium silicate solution, and said plate exhibited results similar to that of Example 1.

EXAMPLE 4

A TLC plate was prepared as in Example 2 except that a potassium silicate solution of 6° Bé. was used instead of the sodium silicate solution, and said plate exhibited similar results as that of Example 1.

EXAMPLE 5

The plate prepared in Example 1 was tested for solvent travel, dye travel and separation, and adsorbent ashesion, and compared with other commercially available plates. The procedures employed were as follows:

(A) Solvent travel was determined by placing a plate as prepared in Example 1 in benzene and measuring the solvent travel rate. A plate having a silica gel film thickness of 0.25 mm. had 8 cm. solvent travel in 30 minutes.

(B) Dye travel and separation was determined by inoculating the plate of Example 1 with Gelman Dye Mixture, a commercially available mixture of organic dyes which is sold specifically for determining the efficiency of TLC plates. Excellent separation was achieved and dye travel times were comparable to those of a Brinkmann Abrasion Resistant plate, a commercially available silica plate.

(C) Adsorbent adhesion was tested by manually abrading the coated plates with the fingers. Those plates prepared according to Examples 1 and 2, when compared with an Abrasion Resistant plate (Brinkmann Instruments Co.), were found to possess excellent adhesion characteristics.

From the foregoing description, one skilled in the art can easily ascertain the essential characteristics of this invention, and without departing from the spirit and scope thereof, can make various changes and modifications of the invention to adapt it to their various usage and conditions. Consequently, such changes and modifications are properly equitably and intended to be, within the full range of equivalence of the following claims.

We claim:
1. A method for securing a thin layer chromatographic adsorbent layer to a substrate, said method comprising:
   (a) preparing a slurry of chromatographic adsorbent selected from the group consisting of silica gel, aluminum oxide and diatomaceous earth in an aqueous solution of alkali metal silicate;
   (b) applying a film of said slurry to a substrate; and
   (c) drying said film to form a uniform layer of adsorbent on said substrate.
2. The method of claim 1 wherein said chromatographic adsorbent is silica gel.
3. The method of claim 1 wherein said chromatographic adsorbent is aluminum oxide.
4. The method of claim 1 wherein said chromatographic adsorbent is diatomaceous earth.
5. The method of claim 2, wherein said slurry has a weight ratio of liquid to solid of about 6–2:1.
6. The method of claim 5 wherein said aqueous solution of alkali metal silicate is about 4–10° Bé.
7. The method of claim 6 wherein said alkali metal silicate is sodium silicate.
8. The method of claim 2 wherein said drying of said film comprises; (a) initially drying said film in an atmosphere having a relative humidity of about 50–80% at room temperature for about 4–8 hours, and (b) subsequently drying said film at about room relative humidity and temperature for about 2–4 hours.
9. A method for securing a thin layer of silica gel to a substrate, said method comprising:
   (a) preparing a slurry of silica gel, said gel having about 100–200 mesh particle size, in an aqueous solution of sodium silicate, said solution being about 4–10° Bé.;
   (b) applying a film of said slurry of about 0.2–8 mm. to a substrate; and
   (c) drying said film by (i) initially drying said film in an atmosphere having relative humidity of about 50–80% at room temperature for about 4–8 hours, and (ii) subsequently drying said film at about room relative humidity and temperature for about 2–4 hours.

References Cited

UNITED STATES PATENTS

| | | | |
|---|---|---|---|
| 3,284,236 | 11/1966 | Schmitz | 117—135.1X |
| 3,303,043 | 2/1967 | Halpaap et al. | 117—124(A)X |
| 3,466,221 | 9/1969 | Sams et al. | 117—135.1X |

OTHER REFERENCES

Silicate P's & Q's: vol. 44, No. 10, Philadelphia Quartz Co., Philadelphia, Pa., October 1964 (264-Silicate Digest).

ALFRED L. LEAVITT, Primary Examiner

E. G. WHITBY, Assistant Examiner

U.S. Cl. X.R.

117—124A, 135.1, 169; 210—31